United States Patent
Barot et al.

(10) Patent No.: US 11,428,341 B2
(45) Date of Patent: Aug. 30, 2022

(54) ENCAPSULATED SOLENOID VALVE

(71) Applicant: OxiCool Inc., Malvern, PA (US)

(72) Inventors: Ravikant T. Barot, Phoenixville, PA (US); Brandon K. Wilcox, Downingtown, PA (US); David Lee Martin, Penn Valley, PA (US)

(73) Assignee: OxiCool, Inc., Malvern, PA (US)

( * ) Notice: Subject to any disclaimer, the term of this patent is extended or adjusted under 35 U.S.C. 154(b) by 0 days.

(21) Appl. No.: 17/263,627

(22) PCT Filed: Jul. 26, 2019

(86) PCT No.: PCT/US2019/043661
§ 371 (c)(1),
(2) Date: Jan. 27, 2021

(87) PCT Pub. No.: WO2020/023875
PCT Pub. Date: Jan. 30, 2020

(65) Prior Publication Data
US 2021/0190230 A1    Jun. 24, 2021

Related U.S. Application Data

(60) Provisional application No. 62/711,257, filed on Jul. 27, 2018.

(51) Int. Cl.
*F16K 31/06* (2006.01)
(52) U.S. Cl.
CPC ...... *F16K 31/0679* (2013.01); *F16K 31/0606* (2013.01); *F16K 31/0624* (2013.01)

(58) Field of Classification Search
CPC ............. F16K 31/0679; F16K 31/0658; F16K 31/0675; F16K 31/082; F16K 31/084; F16K 31/086; F16K 31/0606; F16K 31/0624
See application file for complete search history.

(56) References Cited

U.S. PATENT DOCUMENTS

| | | | |
|---|---|---|---|
| 802,945 A * | 10/1905 | Waterman | F16K 31/0679 251/129.1 |
| 1,177,761 A * | 4/1916 | Clemmer | F16K 31/0679 251/129.1 |
| 4,637,427 A | 1/1987 | Nolan et al. | |
| 5,445,184 A | 8/1995 | Racine et al. | |
| 5,915,625 A | 6/1999 | Focke et al. | |
| 6,814,339 B2 | 11/2004 | Berger et al. | |
| 2010/0133453 A1* | 6/2010 | Hoppe | B05C 5/0225 251/65 |
| 2013/0092855 A1* | 4/2013 | Bebb | F16K 31/0658 251/129.15 |
| 2017/0356566 A1 | 12/2017 | Bentz | |

OTHER PUBLICATIONS

International Search Report and Written Opinion dated Oct. 16, 2019 for PCT Application No. PCT/US19/43661, 10 pages.

* cited by examiner

*Primary Examiner* — Umashankar Venkatesan
(74) *Attorney, Agent, or Firm* — Lee & Hayes, P.C.

(57) ABSTRACT

Technologies are described herein or a solenoid valve having an encapsulated magnetic piston. In some examples, the piston comprises a ferromagnetic core encapsulated by a low reactive outer shell. In some examples, the low reactive outer shell is selected for use within a system at a vacuum. In further examples, the valve is used in a cooling system that uses an adsorbent.

17 Claims, 8 Drawing Sheets

ENCAPSULATED SOLENOID VALVE

CROSS REFERENCE TO RELATED APPLICATIONS

This application is a U.S. National Phase Application of International Application No. PCT/US2019/043661, filed Jul. 26, 2019, which claims the benefit of U.S. Provisional Application No. 62/711,257, filed Jul. 27, 2018, which are incorporated herein by reference in their entirety.

BACKGROUND

Solenoid valves have been used in various industrial applications. Solenoid valves typically have three basic components: a cylinder, a magnetic force component, and a valve body having an inlet and an outlet. Typically, a magnetic force drives the cylinder from an open position to a closed position. When reversed, the magnetic force drives the cylinder from a closed position to an open position. Some solenoid valves include a biasing force that can move the cylinder, in the absence of or in conjunction with the magnetic force, to an open position (normally opened valve) or a closed position (normally closed valve).

It is with respect to these and other considerations that the disclosure made herein is presented.

SUMMARY

Technologies are described herein for a solenoid valve having an encapsulated magnetic piston. In some examples, the piston comprises a ferromagnetic core encapsulated by a low reactive outer shell. In some examples, the low reactive outer shell is selected for use within a system at a vacuum. In further examples, the valve is used in a cooling system that uses an adsorbent.

In some examples, the solenoid valve further includes a magnetic force component to impart a magnetic force onto the ferromagnetic core. In some examples, the force component is one or more coils that, when energized with a suitable electrical current, imparts an electromagnetic force onto the ferromagnetic core. In other examples, the force component is one or more permanent magnets that, when moved to a suitable position relative to the ferromagnetic core, impart a magnetic force onto the ferromagnetic core.

In some examples, the solenoid valve includes a biasing component that provides a biasing force on the ferromagnetic core. In some examples, the biasing force of the biasing component causes the piston to move to or stay in a closed position absent from the force of the magnetic force component (normally-closed valve). In other examples, the biasing force of the biasing component causes the piston to move to or stay in an open position absent from the force of the magnetic force component (normally-open valve).

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
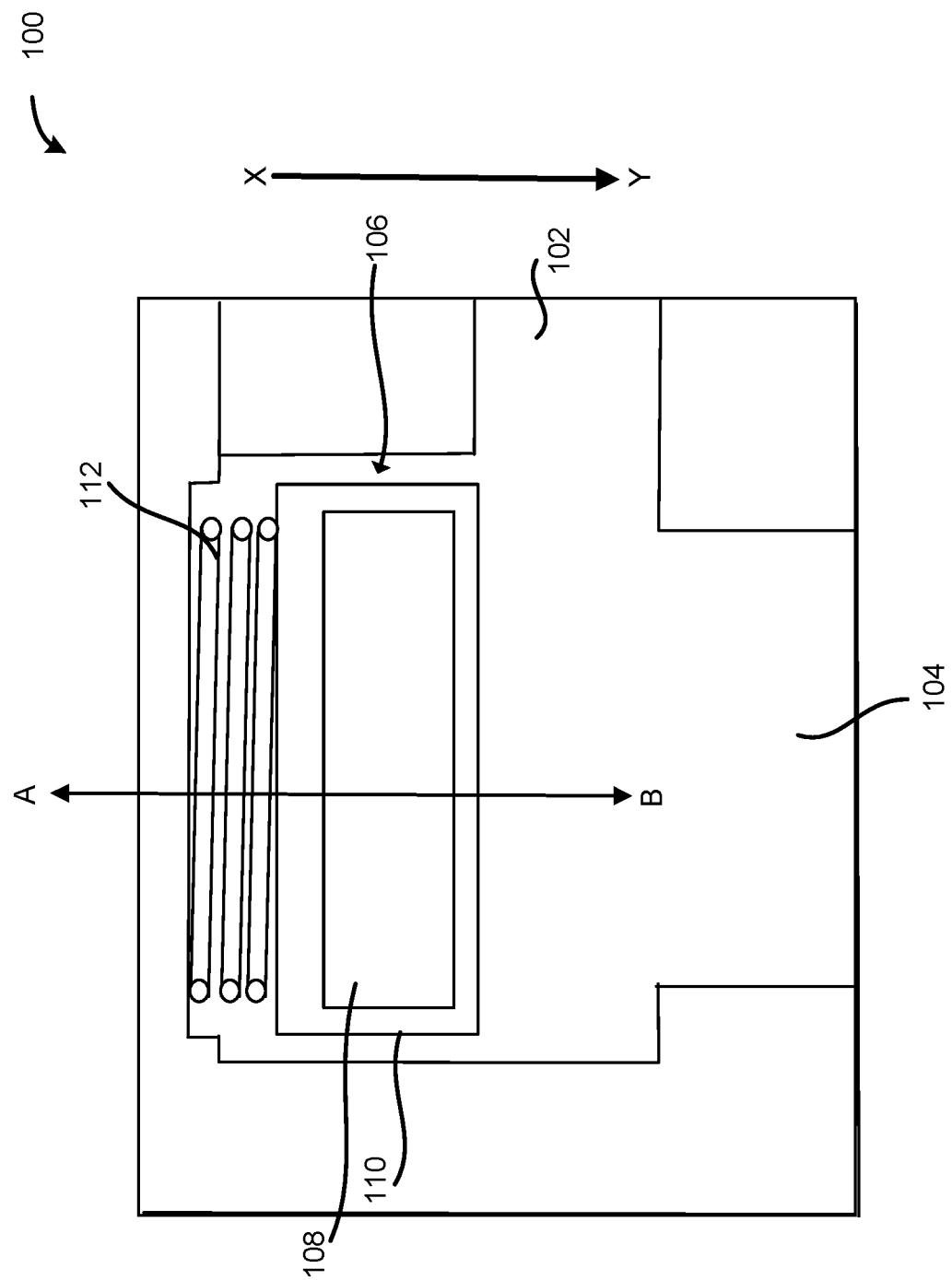
FIG. 1 is a side view of a solenoid valve according to an example of the presently disclosed subject matter.

The following detailed description is directed to technologies for a solenoid valve. In some examples, the solenoid valve is designed for use in a system operating at a low to high vacuum. Although the presently disclosed subject matter is not limited to any definition of low vacuum or high vacuum, in some examples, a low vacuum can be defined as a pressure of 760 to 25 Torr, a medium vacuum can be defined as a pressure of 25 to $1 \times 10^{-3}$ Torr, and a high vacuum can be defined as a pressure of $1 \times 10^{-3}$ to $1 \times 10^{-9}$ Torr. In some examples, the valve may also be used in an ultrahigh vacuum environment. It should be noted, however, that the presently disclosed subject matter is not limited to use in a system operating at a vacuum.

In some uses, particular metals can be problematic in a vacuum. Metals for use in a vacuum should be resistant to or have a low probability of outgassing, as well as being tolerant to bake-out temperatures. Gas or other materials can be created in a vacuum-based system. For example, molecules of gases and water can be adsorbed on the material surface. Because of this, materials having a low affinity to water may need to be selected. Other materials may sublimate in a vacuum. In addition, gases can be released from porous metals or through cracks and crevices. Traces of lubricants or other cleaning compounds can also be a source of unwanted material in a system at vacuum.

Some cooling systems that use adsorbents operate at a vacuum. In some examples, there is a cooling system comprising at least one evaporator operating at a vacuum containing a refrigerant, at least one adsorbent chamber fluidly coupled to the at least one evaporator, the adsorbent chamber (or cell) containing adsorbent configured to provide adsorption of vaporized refrigerant from the at least one evaporator in a cooling mode and configured to provide desorption of the refrigerant to the at least one evaporator in a recharging mode, and a control system configured to control the adsorption and desorption of the refrigerant of the at least one adsorbent chamber between the cooling modes and recharging modes during a cooling cycle, wherein at the end of the cooling cycle the control system is programmed to cease desorption of the refrigerant from the at least one adsorbent chamber, allow adsorption of the vaporized refrigerant from the at least one evaporator and at the end of the adsorption cycle continue to maintain the at least one adsorbent chamber in an adsorbed state.

In some examples, there is a cooling system comprising at least one evaporator containing a refrigerant, at least two adsorbent chambers fluidly coupled to the at least one evaporator and each containing adsorbent configured to provide adsorption of vaporized refrigerant from the at least one evaporator in a cooling mode and configured to provide desorption of the refrigerant to the at least one evaporator in a recharging mode, and a control system configured to control the adsorption and desorption of the refrigerant of the at least two adsorbent chambers, the control system being programmed to alternate the at least two adsorbent chambers between the cooling modes and recharging modes to maintain substantially continuous adsorption of the vaporized refrigerant from the at least one evaporator during a cooling cycle, wherein at the end of the cooling cycle the control system is programmed to cease desorption of the refrigerant from the at least two adsorbent chambers, allow adsorption of the vaporized refrigerant from the at least one evaporator and at the end of the adsorption cycle continue to maintain the at least two adsorbent chambers in an adsorbed state in a winterization configuration.

FIG. 1 is a side view of a solenoid valve 100 according to an example of the presently disclosed subject matter. The solenoid valve includes an outlet 102 and an inlet 104. The outlet 102 and the inlet 104 are designed to facilitate the movement of fluid through the valve 100 when the valve 100 is in an open position.

The valve 100 includes a piston 106. The piston 106 includes a core 108 and a sheath 110. The sheath 110 encapsulates, or fully encloses, the core 108. In some examples, the core 108 is ferromagnetic. As used herein, "ferromagnetic" means a material comprising a permanent magnet or a material that is magnetically attracted to or repulsed from a magnetic field. In some examples, the core 108 comprises iron, nickel, or cobalt. It should be understood, however, that presently disclosed subject matter is not limited to any particular ferromagnetic material, as other suitable ferromagnetic materials may be used.

In some examples, the sheath 110 comprises a material suitable for use, and in some examples, protects the core 108 from the fluids used within the system and which, if not for the sheath 110, may come into contact with the core 108. In some examples, the sheath 110 is designed to operate in a vacuum. As discussed briefly above, materials suitable for use in a vacuum typically have a low rate of outgassing in a vacuum. Further, in some examples, materials used in a vacuum have a low rate of adsorption (i.e. a low affinity to water) and experience little to no sublimation in a vacuum.

Although not limited to any particular material, some materials that may be used in conjunction with various examples of the presently disclosed subject matter (depending on the vacuum) include, but are not limited to austenitic stainless steels, mild steel, aluminum and aluminum alloys, aluminum, bronze, nickel, nickel alloys, beryllium, oxygen-free copper, brass, indium, gold, platinum, zirconium, tungsten, molybdenum, tantalum, titanium and niobium.

In some examples, the thickness of the sheath 110 around the core 108 can vary according to the particular application. For example, in applications in which plasma vapor deposition is used to coat the core 108, the average thickness of the sheath 110 (as measured from an outer surface of the sheath 110 to an inner surface of the sheath proximate to and abutting the core 108) can range from 0.25 microns to over 5 microns.

In some examples, a particular gauge of sheath 110 material can be used. For example, gauge 1 stainless steel at 0.2812 inches down to gauge 38 stainless steel at 0.0062 inches may be used. It should be noted that the thickness of the sheath 110 selected can depend on various factors, including, but not limited to, the system pressure, the type of material used for the sheath 110, the type of material used for the core 108, and chemical or mechanical interactions between the sheath 110 and fluid that comes in contact with the sheath 110.

In some examples, it may be preferable to bias the piston 106 of the valve 100, so that in the absence of a magnetic or electromagnetic force, the piston 106 moves to a particular position. In the example illustrated in FIG. 1, a biasing spring 112 is provided. The biasing spring 112 provides a force vector XY. The force represented by force vector XY provides a force to attempt to move the piston 106 from position A (the open position) to position B (the closed position) along line AB. In the example illustrated in FIG. 1, absent other force vectors, the piston 106 would move to, and or stay at, position B of line AB, and would require an additional force vector to move the piston 106 from position B to position A of line AB.

Thus, as illustrated, the valve 100 may be called a "normally closed" valve. It should be understood, however, that the presently disclosed subject matter is not limited to any particular manner of biasing the valve 100. In some examples, the valve 100 may not include a biasing force. In other examples, a biasing force may be provided by a mechanism other than a spring (such as a permanent magnetic installed in a suitable location).

Figure 2:
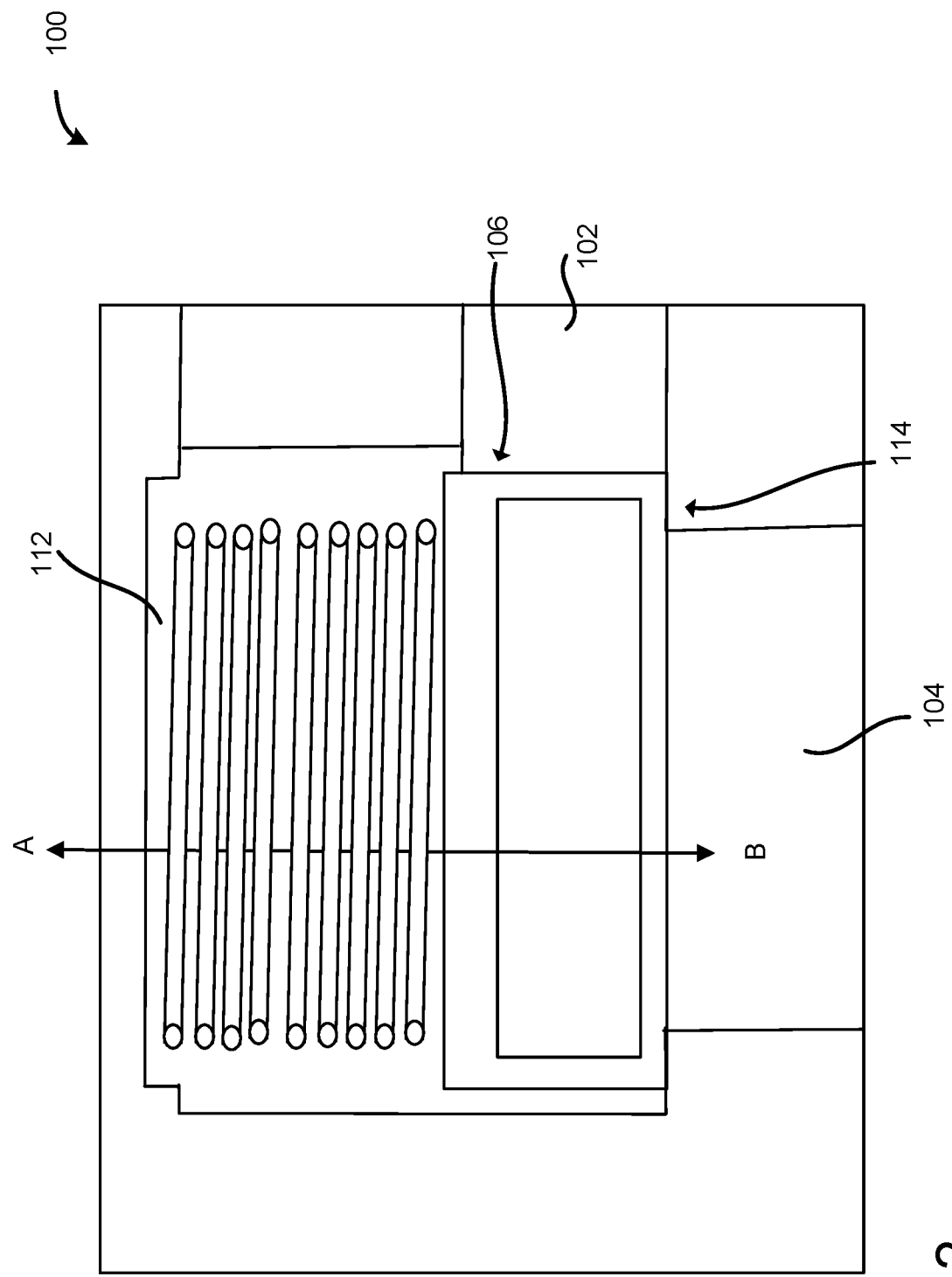
FIG. 2 is a side view of a solenoid valve in the closed position according to an example of the presently disclosed subject matter.

FIG. 2 is a side view of the solenoid valve 100 in the closed position. In FIG. 2, the biasing spring 112 has provided a force to move the piston 106 from position A (the open position) to position B (the closed position). In this configuration, the piston 106 is seated against seat 114, preventing fluid from moving through inlet 104 to outlet 102. It should be noted that the presently disclosed subject matter may be used on other types of valves than the valve 100 illustrated in FIGS. 1 and 2. For example, the valve 100 can be a solenoid operated gate valve, check valve, throttle valve, and the like. The presently disclosed subject matter is not limited to any particular type of valve, and may be used in various suitable applications.

Figure 3A:
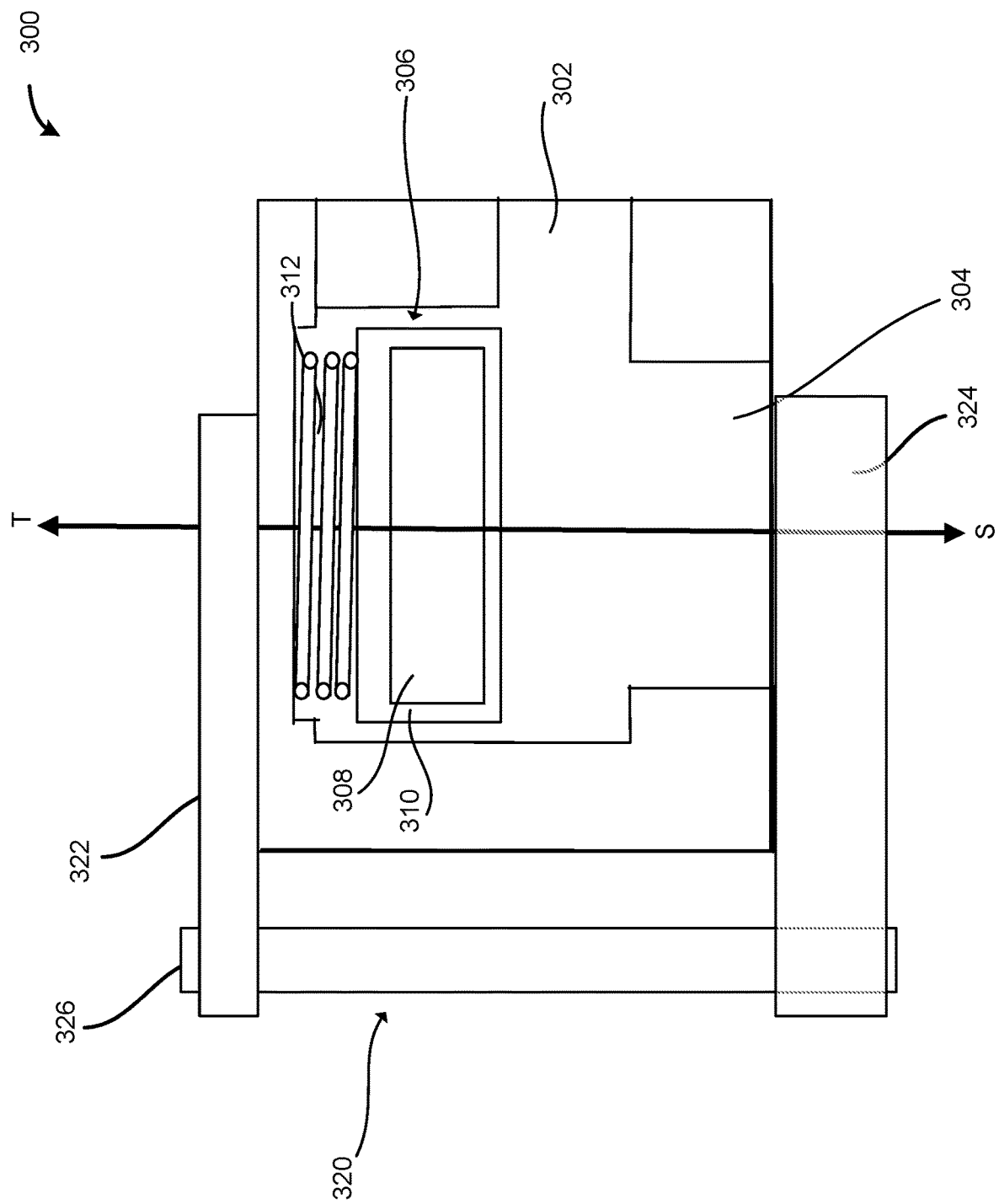
FIGS. 3A-3C are views of a solenoid valve with movable magnets according to an example of the presently disclosed subject matter.

FIG. 3A is a side view of a valve 300 that uses magnets to move a piston. In FIG. 3A, the valve 300 includes an outlet 302 and an inlet 304. The outlet 302 and the inlet 304 are designed to facilitate the movement of fluid through the valve 300 when the valve 300 is in an open position. The valve 300 includes a piston 306. The piston 306 includes a core 308 and a sheath 310. The sheath 310 encapsulates, or fully encloses, the core 308. In some examples, the core 308 is ferromagnetic. The valve 300 also includes a biasing spring 312 that imparts a biasing force on the piston 306 in a manner similar to the biasing spring 112 of FIGS. 1 and 2.

As noted with respect to FIGS. 1 and 2, to move the piston 306 from one position (e.g. a closed or open position) to another position (e.g. an open or closed position), a force component 320 may be used. In FIG. 3A, the force component 320 includes a first magnet 322, a second magnet 324, and a coordinating bar 326. In some examples, the first magnet 322, when appropriately positioned, provides a magnetic force vector that is designed to move the core in a particular direction. In some examples, the second magnet 324, also when appropriately positioned, provides a magnetic force vector that is designed to move the core in a different direction. The coordinating bar 326 is mechanically connected to both the first magnet 322 and the second magnet 324 to mechanically coordinate the movement of the first magnet 322 with the second magnet 324.

For example, the polarity and position of the first magnet 322 may impart a magnetic force vector in the direction of T to S, and, the polarity and position of the second magnet 324 may impart a magnetic force vector in the direction of S to T. Thus, when the first magnet 322 is properly positioned, the piston 306 will have imparted on it a magnetic force that tends to move the piston 306 to a closed position (such as the closed position illustrated in FIG. 2). In a similar manner, when the second magnet 324 is properly positioned, the piston 306 will have imparted on it a magnetic force that tends to move the piston 306 to an open position (such as the open position illustrated in FIG. 1).

It should be appreciated that various examples of the presently disclosed subject matter may only use the first magnet 322 or only the second magnet 324, relying on the biasing spring 312 to provide a force to move the piston 306 to a desired position in the absence of a magnetic field. It should also be appreciated that, in some examples, the magnet force directions described above for the first magnet 322 and the second magnet 324 may be reversed.

The coordinating bar 326 is used to move the first magnet 322 and the second magnet 324 into a position to move the piston 306 to a desired position. In some examples, the coordinating bar 326 is attached to a first distal end of the first magnet 322 and a first distal end of the second magnet 324. The coordinating bar 326 can rotate about an axis, engaging and disengaging the first magnet 322 and the second magnet 324, as illustrated by way of example in FIGS. 3B and 3C.

Figure 3B:
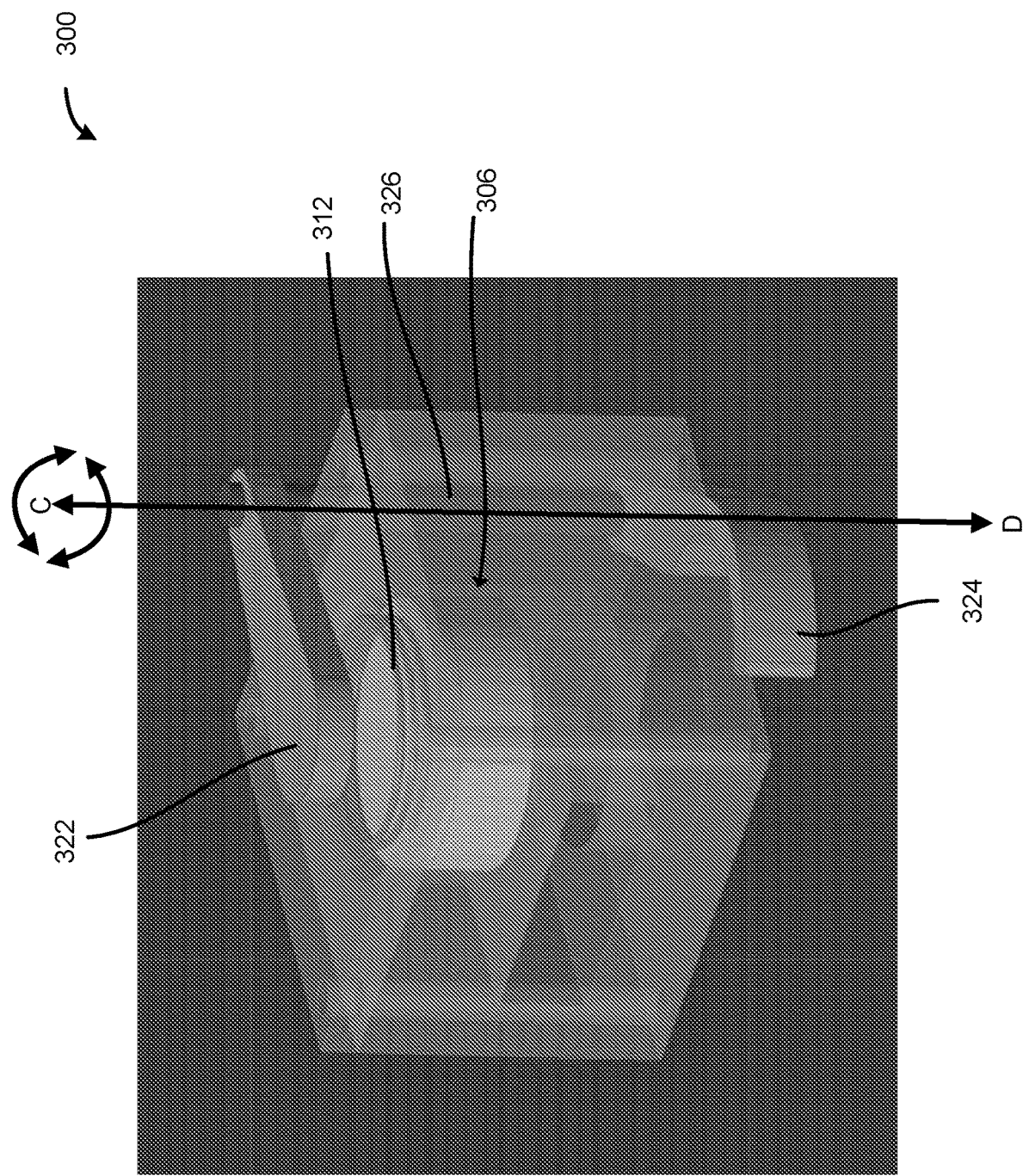

FIG. 3B is a side, perspective view of the valve 300 showing the first magnet 322 engaged with the piston 306. In FIG. 3B, the coordinating bar 326 has been rotated about axis CD, which is collinear to the coordinating bar 326. The manner in which the coordinating bar 326 is rotated may vary. For example, the coordinating bar 326 may be rotated using a motor, a gearing system, other magnets (all not shown) and the like. The presently disclosed subject matter is not limited to any particular manner in which the coordinating bar 326 is rotated.

As used herein, "engaged" means that a magnet or electromagnet, is placed in a position or provided a sufficient current, as applicable, to impart a magnet force upon the piston 306 of sufficient magnitude that is intended to move the piston 306 to a desired position. It should be understood that in some examples, although a magnet or electromagnet may be in the engaged position or receive a proper current, the piston 306 may not move do to other forces imparted upon the piston 306.

In FIG. 3B, the second magnet 324 is rotated to a disengaged position. As used herein, "disengaged" means that a magnet or electromagnet is placed in a position or not provided a sufficient current, as applicable, to impart a magnet force upon the piston 306 that may move the piston 306. In the example illustrated in FIG. 3B, the magnetic force provided by the engaged first magnet 322 has moved (or pulled) the piston 306 into an open position by overcoming the force provided by the biasing spring 312. Also, because the second magnet 324 is in a disengaged position, the magnetic force provided by the second magnet 324 has little to no effect on the movement of the piston 306 into the open position illustrated in FIG. 3B.

Figure 3C:
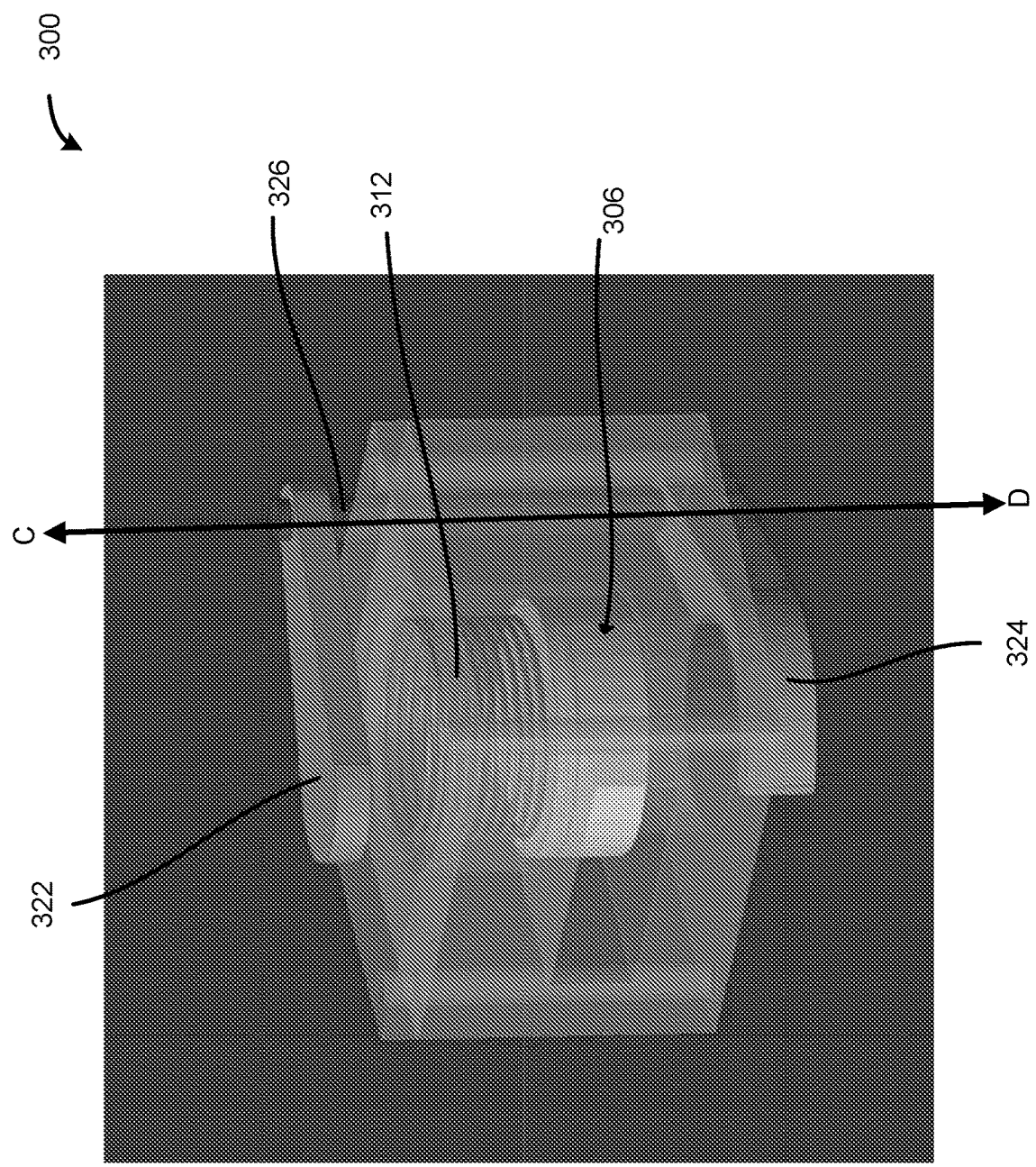

FIG. 3C is a side, perspective view of the valve 300 showing the first magnet 322 disengaged with the piston 306 and the second magnet 324 engaged with the piston 306. In FIG. 3C, the coordinating bar 326 has been rotated about axis CD so that the first magnet 322 moves from the engaged position illustrated in FIG. 3B to a disengaged position illustrated in FIG. 3C. Similarly, the coordinating bar 326 has been rotated about axis CD so that the second magnet 324 moves from the disengaged position illustrated in FIG. 3B to an engaged position illustrated in FIG. 3C.

Due to the configuration of the first magnet 322 and the second magnet 324, the piston 306 has moved from the open position illustrated in FIG. 3B to the closed position illustrated in FIG. 3C. It should be understood that, in some examples, the second magnet 324 may not be used, as the force of the biasing spring 312 may be sufficient to move the piston 306 to the closed position when the first magnet 322 is in a disengaged position.

Figure 4A:
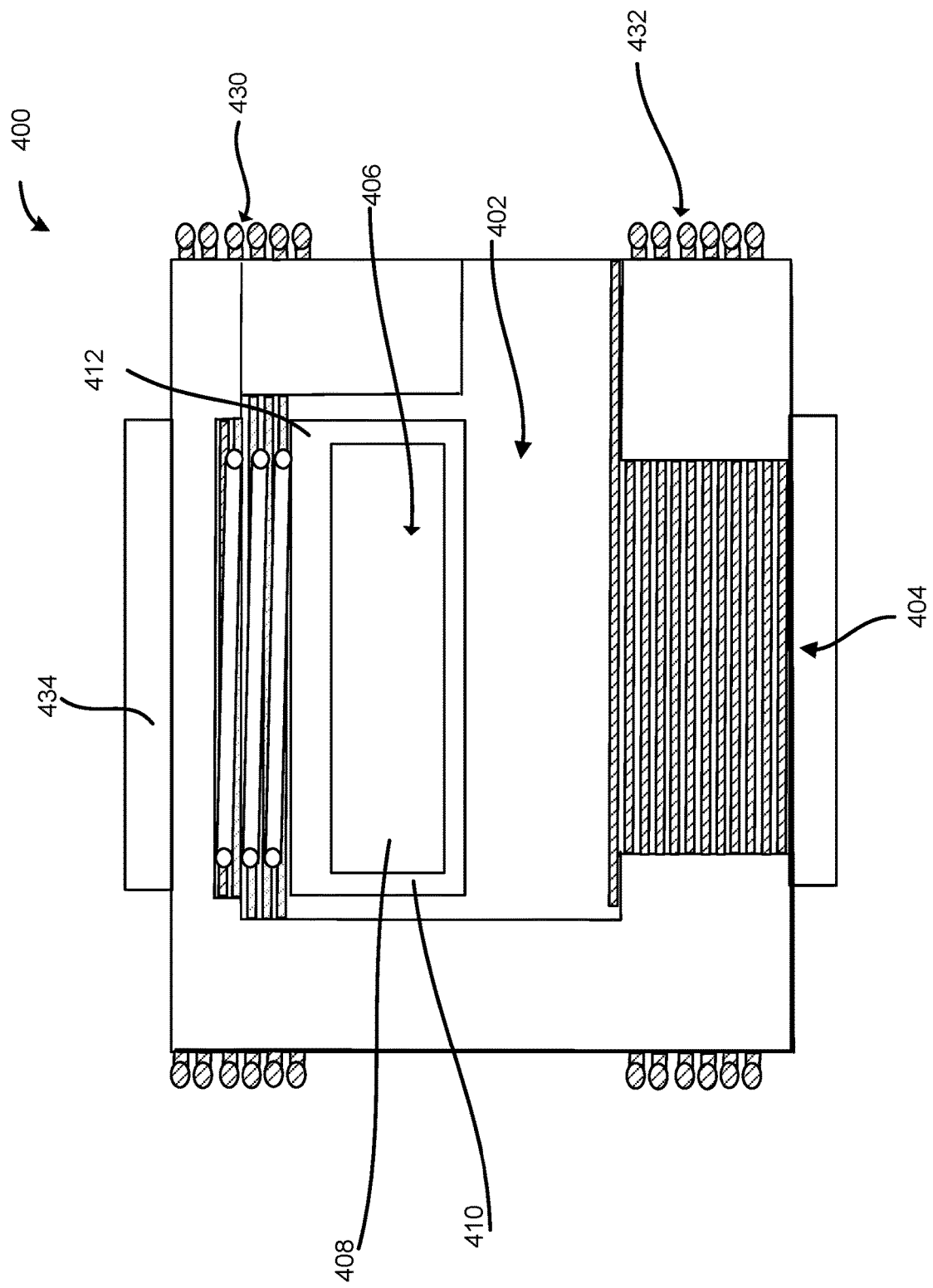
FIGS. 4A and 4B illustrate the use of electromagnets to move a piston in solenoid valve according to an example of the presently disclosed subject matter.
Figure 4B:
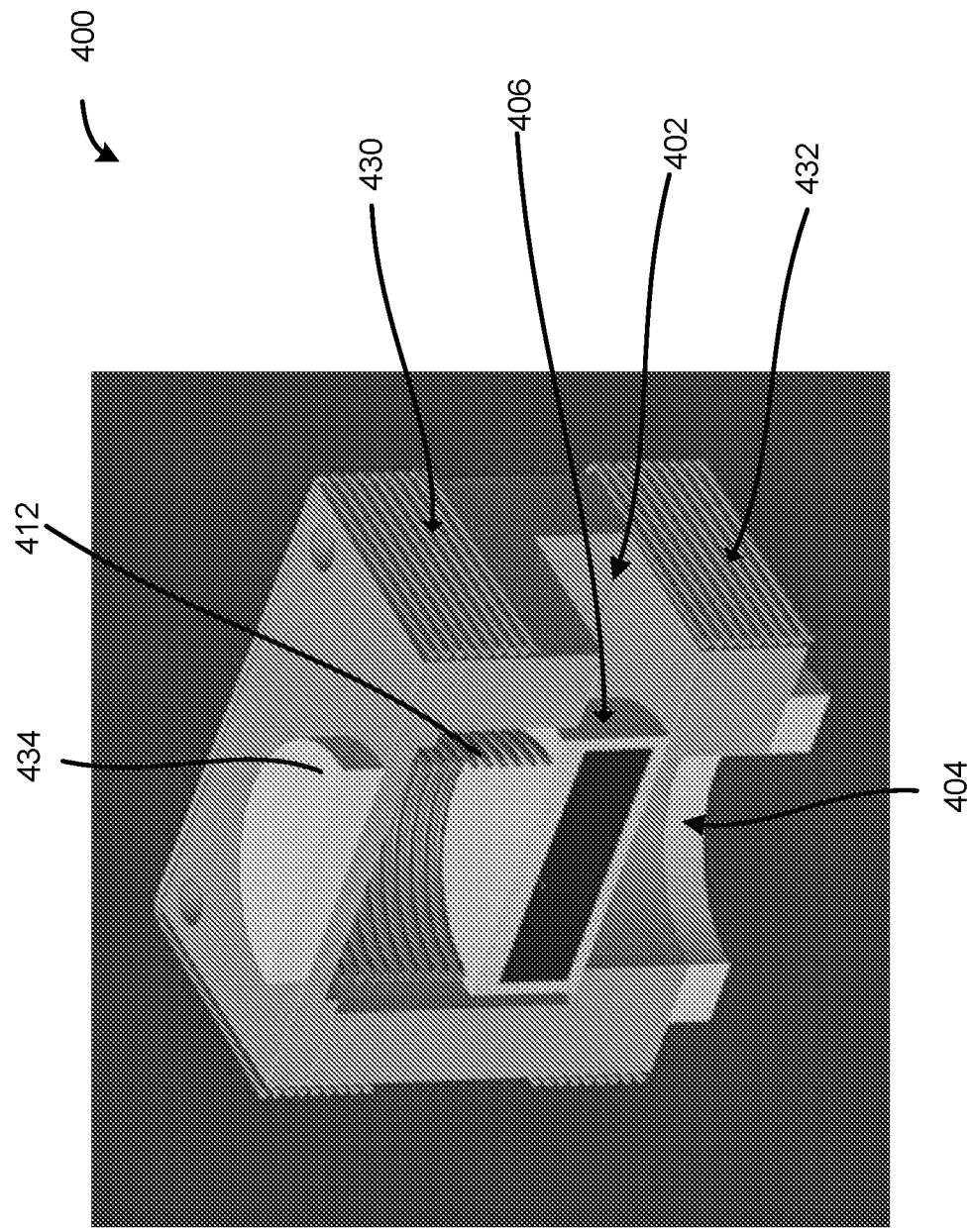

FIGS. 4A and 4B illustrate the use of electromagnets to move a piston in a solenoid valve. In FIG. 4A, a valve 400 is illustrated. The valve 400 includes an outlet 402 and an inlet 404. The outlet 402 and the inlet 404 are designed to facilitate the movement of fluid through the valve 400 when the valve 400 is in an open position. The valve 400 includes a piston 406. The piston 406 includes a core 408 and a sheath 410. The sheath 410 encapsulates, or fully encloses, the core 408. In some examples, the core 408 is ferromagnetic. The valve 400 also includes a biasing spring 412 that imparts a biasing force on the piston 406 in a manner similar to the biasing spring 112 of FIGS. 1 and 2.

To move the piston 406 from the open position illustrated in FIG. 4A to the closed position illustrated in FIG. 4B, the valve 400 further includes first coil 430 and second coil 432. The first coil 430, when energized with a sufficient current, imparts a magnetic force onto the core 408 of the piston 406 designed to move the piston 406 either to an open position or a closed position, depending on the polarity of the electromagnetic field of the first coil 430 with respect to the magnetic field of the core 408. In a similar manner, the second coil 432, when energized with a sufficient current, imparts a magnetic force onto the core 408 of the piston 406 designed to move the piston 406 either to an open position or a closed position, depending on the polarity of the electromagnetic field of the second coil 432 with respect to the magnetic field of the core 408.

The first coil 430 and the second coil 432 can be operated independent of each other, or may be operated together. For example, to move the piston 406 from one position to another, both the first coil 430 and the second coil 432 can be energized with current flowing in different directions. The current flowing in different directions creates opposite polarities of the magnetic force of the first coil 430 and the second coil 432. Thus, while one coil may pull the piston 406 towards it (e.g. acting as an attractive force), the other coil may push the piston away from it (e.g. acting as a repulsive force).

In some examples, it may be beneficial to provide one or more magnets to further control the movement of the piston 406. In some examples, when a current is applied to the first coil 430 or the second coil 432 (e.g. energized), the attractive or repulsive force experienced by the piston 430 may increase as the location of the piston 406 gets closer to the energized coil. Thus, the speed of the piston 406 may increase as the piston 406 gets closer to the energized coil. In some examples, this increase in velocity can cause the piston 406 to undesirably strike or hit an inner surface of the valve 400. Thus, a biasing magnet 434 may be used to try to control the movement of the piston 406.

The biasing magnet 434 can be a permanent magnet or electromagnet that is designed to provide a magnetic field that interacts with and reduces the strength of the magnetic field of the first coil 430 (and bottom coil if another biasing magnet is used). However, it may be undesirable for the magnetic field of the biasing magnet 434 to reduce the impact of the magnetic field of the first coil 430 when the piston 406 is not near an endpoint of travel (i.e. not near the closed position or the open position).

Therefore, the biasing magnet 434 can have a small electric field that the core 408 of the piston 406 experiences when the piston 406 is relatively close to an endpoint of travel of the piston 406 (i.e. the piston 406 is near the closed position or the open position). The magnetic field strength of the biasing magnet 434 can be selected to provide various performance characteristics depending on the particular application used.

FIG. 4B illustrates the valve 400 in a closed position. In FIG. 4B, the first coil 430 and/or the second coil 432 are energized or deenergized, as appropriate, to cause the movement of the piston 406 from the open position illustrated in FIG. 4A to the closed position illustrated in FIG. 4B. As illustrated, the biasing spring 412 is extended, providing a force to assist in the movement of the piston 406 to the closed position.

As noted above, the configuration of the first coil 430 and the second coil 432 can vary from application to application. For example, the first coil 430 can provide a repulsive force and the second coil 432 can provide an attractive force to move the piston 406 from the open to the closed position. In another example, to move the piston 406 from the open to the closed position, only the second coil 432 can be energized. The presently disclosed subject matter is not limited to any particular configuration.

Figure 5:
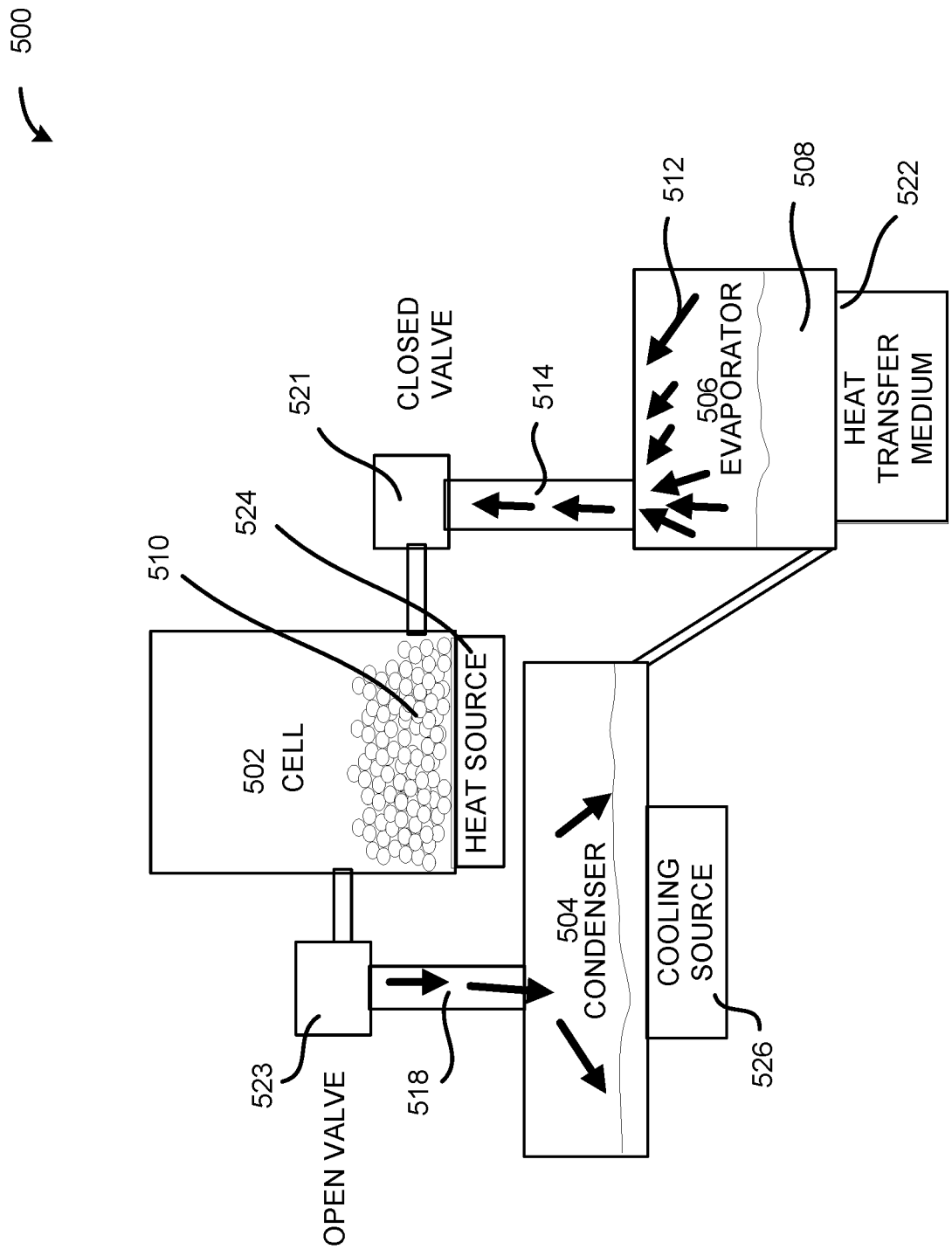
FIG. 5 is a system diagram illustrating a cooling system using solenoid valves according to an example of the presently disclosed subject matter.

FIG. 5 is a system diagram illustrating a cooling system 500 using various aspects of solenoid valves as described herein. In FIG. 5, the cooling system 500 includes an adsorbent cell 502, a condenser 504, and an evaporator 506. The cooling system 100 includes a refrigerant 508. In some examples, the refrigerant 508 is water. In some examples, the refrigerant 508 is pure water. In some examples, the refrigerant 508 is substantially pure water. In some examples, the refrigerant 508 is water containing no additives.

In other systems, water containing adjuvants may be desired as the refrigerant 508. An example of useful adjuvants is an anti-microbial (e.g., bactericidal or fungicidal) composition. In some examples, the refrigerant 508 does not contain materials which would interfere with operation of cooling system 500 in its operation. Thus, in some examples, glycols and other antifreeze agents can be excluded from the refrigerant 508, at least in amounts effective for storing cooling system 500 in ambient conditions around or below the freezing point of the refrigerant 508.

In some examples, the evaporator 506 is fluidly coupled to the adsorbent cell 502 containing an adsorbent 510. In some examples, adsorbent 510 is a material configured to adsorb and desorb the refrigerant 508. In some examples, the adsorbent 510 is configured to provide adsorption of vaporized refrigerant 512 from the evaporator 506 in a cooling mode and configured to provide desorption of the refrigerant 508 to the condenser 504 in a recharging mode.

In some examples, the adsorbent 510 exhibits a high ability to adsorb refrigerant 508 and to remain in an adsorbed state over practical lengths of time, while maintaining physical and physicochemical form and function. Such materials may be useful when they exhibit a high ability to adsorb water, efficient and effectively reversible desorption of water upon application of heat energy, and physical and physicochemical stability during and following repeated adsorption and desorption cycles.

In some examples, the adsorbent 510 includes a desiccant material. In some examples, the adsorbent 510 is a desiccant. In some examples, the adsorbent 510 is zeolite. A zeolite may be described as, but without limitation, hydrous aluminum silicate in porous granules. Exemplary zeolites that may be used include analcime, chabazite, heulandite, natrolite, phillipsite and stilbite. In some examples, the adsorbent 510 is any drying agent that maintains its physical structure when substantially fully contacted with water. In other examples, the adsorbent 510 is any adsorptive and/or absorptive material including but not limited to diatomaceous earth, activated alumina, silica gel, calcium aluminosilicate clay, molecular sieves (e.g., electrically charged molecular sieves), metal organic framework materials, activated carbon, and/or lithium chloride. In other examples, the adsorbent 510 may be an electrically chargeable and dischargeable material (e.g., a porous slab or particles of material such as a metal including aluminum, stainless steel and alloys thereof) such that electrical energy is used to control the electrical charge of the pores of the material to adsorb and desorb the refrigerant 508 from the adsorbent 510.

The evaporator 506 is fluidly coupled to the adsorbent cell 502 via a fluid passageway 514 such as a pipe or conduit. In one example, the fluid passageway 514 includes a valve 521 that controls the fluid coupling between the evaporator 506 and the adsorbent cell 502. The condenser 504 is fluidly coupled to the adsorbent cell 502 via a fluid passageway 518 such as a pipe or conduit. In one example, the fluid passageway 518 includes a valve 523 that controls the fluid coupling between the condenser 504 and the adsorbent cell 502.

During the cooling mode, solenoid valve 521 is opened, solenoid valve 523 is closed, and a heat transfer medium 522 is passed over, around and/or through evaporator 506 to form a heat exchanger coupling between heat transfer medium 522 and the evaporator 506. The heat transfer medium 522 may be any suitable media to be cooled or used to cool another medium. Heat transfer medium 522 may be the environment to be cooled directly. In other examples, the heat transfer medium 522 may be used to extend the heat exchange with the evaporator 506 to another area (e.g., a living room or sleeping space) or media. In some examples, the heat transfer medium 522 is air. In some examples, the heat transfer medium 522 is water. In some examples, the heat transfer medium 522 includes glycol mixtures or other antifreeze agents.

As the vaporized refrigerant 512 moves from the evaporator 506 into the adsorbent cell 502, the pressure within the evaporator 506 decreases reducing the boiling point of the refrigerant 508 and causing it to evaporate, thereby decreasing the temperature within the evaporator 506, pulling heat from heat transfer medium 522 such that the temperature of the heat transfer medium 522 decreases.

During use, the vaporized refrigerant 512 is adsorbed into the adsorbent 510. To reset or recharge cooling system 500 and be ready for a subsequent cooling cycle, the valve 521 is closed, the valve 523 is opened, and energy from heat source 524 is applied to the adsorbent cell 502 to cause the adsorbed the refrigerant 508 to desorb from the adsorbent 510, into the condenser 504. A cooling source 526 can be used to condense the desorbed refrigerant 508. The condensed refrigerant 508 can be transferred to the evaporator 506 to allow for additional cooling cycles. It should be understood, however, that some examples of the cooling system 500 do not require the cooling source 526, as the desorbed refrigerant may condense in the condenser 504 based on the temperature of the refrigerant as well as the pressure in the condenser 504.

Based on the foregoing, it should be appreciated that technologies for a solenoid valve having a fully encapsulated magnetic core have been disclosed herein. It is to be understood that the invention defined in the appended claims is not necessarily limited to the specific features or acts described herein. Rather, the specific features or acts are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, aspects of which are set forth in the following claims.

What is claimed is:

1. A solenoid valve comprising:
   a valve body having an inlet port, through which fluid is introduced, and an outlet port, through which the fluid is discharged;
   a piston movably mounted inside the valve body to open or close one or both of the inlet port or the outlet port, the piston comprising
      a magnetic core, and
      a sheath encapsulating the magnetic core; and
   a force component to provide a force vector to move the piston from a closed position to an open position and from an open position to a closed position, wherein the force component comprises:
      a first magnet that imparts a first magnet magnetic force on the piston in a first direction;
      a second magnet that imparts a second magnet magnetic force on the piston in a second direction; and
      a coordinating bar affixed to a distal end of the first magnet and a distal end of the second magnet, whereby the coordinating bar is rotatable to
         place the first magnet in an engaged position and the second magnet in a disengaged position, and
         place the first magnet in a disengaged position and the second magnet in an engaged position.

2. The solenoid valve of claim 1, further comprising a biasing spring that imparts a biasing force on the piston.

3. The solenoid valve of claim 1, wherein the force component comprises:
   a first coil that imparts a first magnet magnetic force on the piston in a first direction; and
   a second coil that imparts a second magnet magnetic force on the piston in a second direction.

4. The solenoid valve of claim 1, further comprising a biasing magnet to control a motion of the piston.

5. The solenoid valve of claim 1, wherein the sheath comprises stainless steel.

6. The solenoid valve of claim 1, wherein the magnetic core is a ferromagnetic core.

7. A method of operating a solenoid valve, the method comprising:
   providing a valve body having an inlet port, through which fluid is introduced, and an outlet port, through which fluid is discharged;
   providing a piston movably mounted inside the valve body to open or close one or both of the inlet port or the outlet port, the piston comprising
      a magnetic core, and
      a sheath encapsulating the magnetic core; and
   providing a force component to provide a force vector to move the piston from a closed position to an open position and from an open position to a closed position, wherein the force component comprises:
      a first magnet that imparts a first magnet magnetic force on the piston in a first direction;
      a second magnet that imparts a second magnet magnetic force on the piston in a second direction; and
      a coordinating bar affixed to a distal end of the first magnet and a distal end of the second magnet, whereby the coordinating bar is rotatable to
         place the first magnet in an engaged position and the second magnet in a disengaged position, and
         place the first magnet in a disengaged position and the second magnet in an engaged position.

8. The method of claim 7, further comprising a biasing spring that imparts a biasing force on the piston.

9. The method of claim 7, wherein the force component comprises:
   a first coil that imparts a first magnet magnetic force on the piston in a first direction; and
   a second coil that imparts a second magnet magnetic force on the piston in a second direction.

10. The method of claim 7, further comprising a biasing magnet to control a motion of the piston.

11. The method of claim 7, wherein the sheath comprises stainless steel.

12. The method of claim 7, wherein the magnetic core is a ferromagnetic core.

13. A solenoid valve comprising:
   a valve body having an inlet port, through which fluid is introduced, and an outlet port, through which fluid is discharged;
   a piston movably mounted inside the valve body to open or close one or both of the inlet port or the outlet port, the piston comprising
      a magnetic core, and
      a sheath encapsulating the magnetic core; and
   a force component to provide a force vector to move the piston from a closed position to an open position and from an open position to a closed position, wherein the force component comprises:
      a first magnet that imparts a first magnet magnetic force on the piston in a first direction;
      a second magnet that imparts a second magnet magnetic force on the piston in a second direction; and
      a coordinating bar affixed to a distal end of the first magnet and a distal end of the second magnet, whereby the coordinating bar is rotatable to
         place the first magnet in an engaged position and the second magnet in a disengaged position, and
         place the first magnet in a disengaged position and the second magnet in an engaged position.

14. The solenoid valve of claim 13, further comprising a biasing spring that imparts a biasing force on the piston.

15. The solenoid valve of claim 13, wherein the force component comprises:
   a first coil that imparts a first magnet magnetic force on the piston in a first direction; and
   a second coil that imparts a second magnet magnetic force on the piston in a second direction.

16. The solenoid valve of claim 13, further comprising a biasing magnet to control a motion of the piston.

17. The solenoid valve of claim 13, wherein the sheath comprises stainless steel and the magnetic core is a ferromagnetic core.

* * * * *